219-121 SR
MTR04 OR 3,267,250

Aug. 16, 1966 L. R. ULLERY, JR 3,267,250

ADAPTIVE POSITIONING DEVICE

Filed April 19, 1963 3 Sheets-Sheet 1

INVENTOR
LEE R. ULLERY, JR.
BY Roy a Van Kirk
ATTORNEY

Aug. 16, 1966 L. R. ULLERY, JR 3,267,250

ADAPTIVE POSITIONING DEVICE

Filed April 19, 1963 3 Sheets-Sheet 2

INVENTOR
LEE R. ULLERY, JR.
BY
Roy A. Van Lik
ATTORNEY

ADAPTIVE POSITIONING DEVICE

Filed April 19, 1963 3 Sheets-Sheet 3

INVENTOR
LEE R. ULLERY, JR.
BY [signature]
ATTORNEY 3,267,250
ADAPTIVE POSITIONING DEVICE
Lee R. Ullery, Jr., Simsbury, Conn., assignor to United Aircraft Corporation, East Hartford, Conn., a corporation of Delaware
Filed Apr. 19, 1963, Ser. No. 274,177
5 Claims. (Cl. 219—121)

My invention relates to the fabrication of microelectronic devices. More particularly, my invention is directed to apparatus which permits automating the process of providing interconnections between the components employed in microminiature circuitry.

One continuous and consistent trend in the history of electronics has been the reduction in the size and weight of the assembly needed for any particular electronic function. Today, the term generally applied to this trend is microminiaturization. While this term is somewhat nebulous, it may be safely stated that any electronics assembly with a packaging density exceeding 100,000 components per cubic foot is considered to be microminiaturized. Other than space and weight considerations, there is a dire need to reduce the physical size of complex electronic systems to thereby increase their speed by shortening the distance that must be travelled by the electronic pulses. Another potential advantage to be accrued from microminiaturization is increased reliability by reduction in the number of electrical interconnections.

Many techniques for reducing the size, weight and power consumption of electronic components, circuit assemblies, and functional units have been proposed and demonstrated. In some cases, for example cord wood assemblies, individual components retain their individualities and are interconnected by relatively standard, although sophisticated, wiring techniques. In certain of the more refined approaches, a number of recognizable devices are combined into an integrated structure in which the interconnecting medium between the devices contributes to the electrical properties of the structure. The latter concept produces what are generally known as functional electronic blocks. The functional electronic block or crystal circuit relies on the creation of several junctions in one slab of host semiconductor material coupled with the realization that semiconductor structure can be fashioned in such a way that regions within the slab yield capacitive and resistive effects. For a discussion of the fabrication of functional electronic blocks, reference may be made to copending application Serial No. 186,467, filed April 10, 1962, now Patent No. 3,178,804, by myself and D. J. Garibotti as co-inventors.

Regardless of which approach to microminiaturization is followed, interconnection problems are presented. Considering for example the functional electronic block approach, the crystal circuit must, at the least, communicate with the outside world. Also, although some of the required passive devices may be fabricated within the elemental block, a large number can not. That is, it is now and probably will remain impossible to create precise temperature independent resistors, non-voltage dependent capacitors, large capacitors required for analog circuitry, inductors, transformers, and storage devices within a chip of semiconductor material. Thus, there is a requirement for additional interconnections between elements of an FEB and external devices. Further, interconnections between individual FEB's are necessary. Except in the most elemental cases, it is inconceivable that a sophisticated electronic system could be fabricated from one slab of material.

Simply stated, it is an extremely expensive and time consuming process to provide the above-mentioned interconnections. Under present state of the art, the provision of leads between individual components and crystal circuits in microminiaturized devices is accomplished manually by soldering under high-powered microscopes. It has, to date, been impossible to automate the process of welding or otherwise attaching the leads on transistors or FEB's to contact pads on substrate boards which have evaporated, plated or printed thereon interconnection paths. This inability to automate has been caused by the fact that production costs of semiconductor devices places a limit upon the obtainable manufacturing tolerances That is, to make the semiconductor devices and particularly the functional electronic blocks practical from a cost point-of-view, care must be taken to not unnecessarily restrict tolerances in the manufacture of the devices or the hermetically sealed packages in which the devices may be included. Thus, it is not unlikely that a tolerance of ±.003 inch in the location of leads can exist in the fabrication of hermetically encapsulated junction devices in order to maintain minimum cost of such devices.

A most desirable method for joining the leads on such junction devices to contact pads on a circuit board is by welding with an electron beam. Electron beam joining is advantageous in that an electron beam as a tool can be easily controlled since it may be readily focused, its power simply adjusted, and it may be electrically deflected to a desired point. Also, a beam of electrons is extremely pure in the chemical sense in that it possesses no contaminates. Another advantage realized through use of electron beam welding is that it eliminates the requirement, imposed by standard resistance welding techniques, of providing return paths for electric currents from the weld. Further, an electron beam joining process can be performed without danger of thermal damage to nearby semiconductor elements since the fushion bond produced by the beam may be made in an extremely short time with a high energy utilization factor. The foregoing is possible because the power density of the beams provided by existing electron beam generators may be as high as $10^9$ watts per square inch. Also, electron beam processes are usually performed in a vacuum thereby further insuring against contamination of the junction regions in semiconductor devices, which regions are particularly susceptible to surface contamination. There are, of course, numerous other advantages to be realized from the use of electron beam joining techniques. In order to provide these advantages, the electron beam generator utilized must be a precision instrument capable of providing a highly focused electron beam. U.S. Patent No. 2,987,610, issued June 6, 1961, to K. H. Steigerwald, discloses such an electron beam machine. Machines such as those shown in the Steigerwald patent are capable of providing electron beams having a power density of from $10^7$ to $10^9$ watts per square inch with a beam diameter of .0005 inch. As should be obvious, for a given total power, the smaller the beam diameter the greater the beam power density and thus the shorter the time required to join a lead to a contact pad. As discussed above, minimizing of the time it takes to join a lead to a contact pad is of critical importance in order to reduce the possibility of thermal damage to the semiconductor elements. Electron beam welding is the only economically practical joining method available today that, for all practical purposes, eliminates the possibility of such thermal damage. However, as can be seen from the foregoing, the minimum obtainable electron beam diameter is many times smaller than the manufacturing tolerances imposed on semiconductor manufacturers and, therefore, the beam diameter is smaller than the possible error in the position of the leads extending from the transistors or FEB's. Consequently, mere fixturing of the semiconductors prior to electron beam welding is insufficient by itself to permit automation of the process.

That is, merely programming the deflection of the electron beam by itself will usually not accomplish the joining of the leads to the contact pads since, due to the possible variations in lead position, the beam may still miss the lead.

It is therefore an object of my invention to overcome the above-stated disadvantages and provide for automatic fabrication of microminiature electronic circuits.

It is another object of my invention to automatically join microminiature electronic circuit components to interconnecting boards or substrates or to each other.

It is also an object of my invention to sense the location of the leads on microminiature electronic circuit elements.

It is a futher object of my invention to automatically cause a highly energized beam to impinge upon the terminal leads extending from a microminiature electronic device.

It is yet another object of my invention to rapidly and inexpensively provide for interconnection of the various components of a microminiature electronic circuit.

It is also an object of my invention to automatically position a tool for working materials at desired points.

These and other objects of my invention are accomplished by novel apparatus which scans the microminiature electronic circuit assembly which has individual unattached circuit componets properly positioned thereon. Means are provided for monitoring the scanning operation and producing a work initiation signal whenever the scanning means senses the occurrence of a lead extending from a circuit component thus fixing a point where interconnection of the component to another portion of the over-all circuit is to be made. Other means are provided which, in response to the work initiation signal, cause a highly energized beam to be generated and which cause this beam to be focused on the point where the joining or interconnection is to be accomplished.

My invention may be better understood and its numerous advantages will become apparent to those skilled in the art by reference to the accompanying drawing wherein like reference numerals refer to like elements in the various figures and in which.

Figure 1:
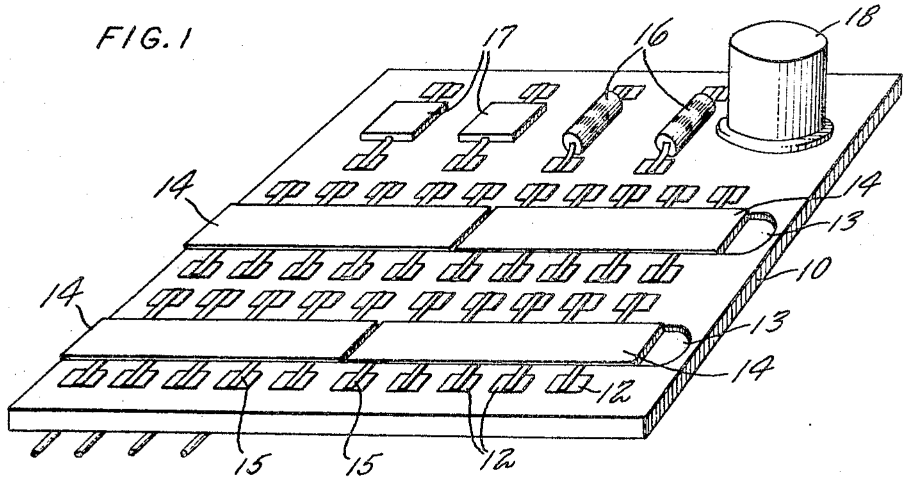
FIGURE 1 depicts a plurality of functional electronic blocks and other circuit elements positioned upon a substrate board which has interconnecting conductive paths deposited thereon.

Referring now to FIGURE 1, there is shown a typical microminiaturized electronic circuit. This circuit comprises a substrate or circuit board 10 upon which contact pads and conductive paths have been formed by gas plating, vapor deposition, or some other suitable process. Two materials, beryllia (BeO) and alumina ($Al_2O_3$), have been used prevalently for the fabrication of substrates for microminiature circuits. Because of its inherent high thermal conductivity, beryllia is best suited for applications where high thermal loads are anticipated such as in servo amplifiers. Alumina is of interest where extreme thermal loads are not expected since it is easier to handle from the fabrication standpoint. In a typical example, contact pads 12, to which the leads from the active and passive devices, in the circuit are to be connected, are formed on the top of the substrate. Vertical feedthroughs between the contact pads and the bottom side of the substrate are formed by drilling holes through the substrate by known electron beam or ultrasonic drilling techniques and then filling the holes with a conductive material which is brazed or welded to the pad. The latter step may be accomplished by inserting pins in the holes or by any of the several methods described in my above-mentioned copending application Serial No. 186,467. On the back of the substrate, the conductive paths for interconnecting the vertical feedthroughs and thus the active and passive circuit components to form the desired electronic circuit are formed by vapor deposition of chromium and electroplating of nickel. Chromium is generally used as the area conductive film because of its ability to form a tenacious bond with ceramic materials such as alumina and beryllia. Nickel is then plated over the chromium film to reduce electrical resistivity, increase thermal conductivity, and also to provide a surface to which leads and pin material may be readily joined by electron beam welding, brazing, etc. The most usual way of forming the conductive paths on the backs of the substrates is to cover the entire surface with the layers of chrome and nickel and to then selectively etch away portions of this conductive material by causing local evaporation with an electron beam. This process forms discrete conductive paths separated by areas in which the conductive material has been selectively removed. Positioned in grooves 13 which are formed in the surface of the substrates during the manufacture thereof are, in the example shown in FIGURE 1, functional electronic blocks 14. It is the problem associated with the connection of the leads from these functional electronic blocks to the contact pads on the substrate which has particularly made it previously impossible to automate the fabrication of circuits using these devices. A typical commercially available functional electronic block has dimensions of .125 by .250 by .035 inch with up to 10 Kovar leads 15 extending from the side thereof. These leads typically have dimensions of .003 by .01 inch and are spaced on .050 inch centers. Also positioned on the top of the substrate are a plurality of passive elements which may be temperature independent resistors 16, nonvoltage dependent capacitors 17 and a hermetically sealed transformer can 18.

Figures 2, 4:
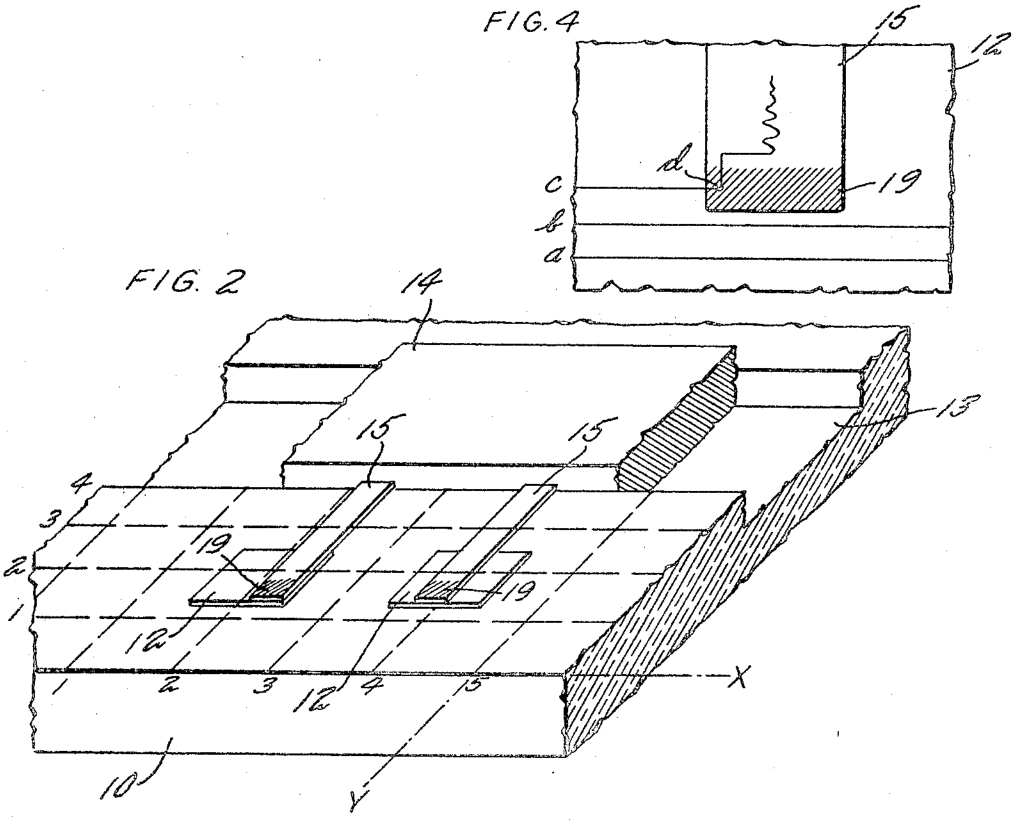
FIGURE 2 is an enlarged view of a portion of a functional electronic block positioned for joining to contact pads on a circuit board.
FIGURE 4 is an enlarged view of a single lead from a functional electronic block positioned for joining to a contact pad on a circuit board.

The above-discussed interconnection problem may be more easily understood by reference to FIGURE 2 which depicts a portion of a functional electronic block 14 positioned for joining the leads 15 thereof to contact pads 12 on a ceramic circuit board 10. Considering first the right hand lead extending from the FEB, assume that this lead is centered exactly within the range of tolerance. Therefore, in order to join this lead to the underlying contact pad by electron beam welding, the electron beam's deflection voltage could be programmed to provide for beam deflection to the co-ordinates X4, Y2 on the overlying grid shown in FIGURE 2. Considering now the left hand load extending from FEB 14, this lead, while still within the limits of tolerance imposed on fabrication of the FEB, is displaced to the right of its optimum position. Consequently, if the beam deflection was programmed to provide a deflection voltage that would cause the beam to impinge upon the work at the next point where a lead should be optimumly overlap a contact pad, at co-ordinates X2, Y2, the beam would miss the lead entirely.

Figure 3:
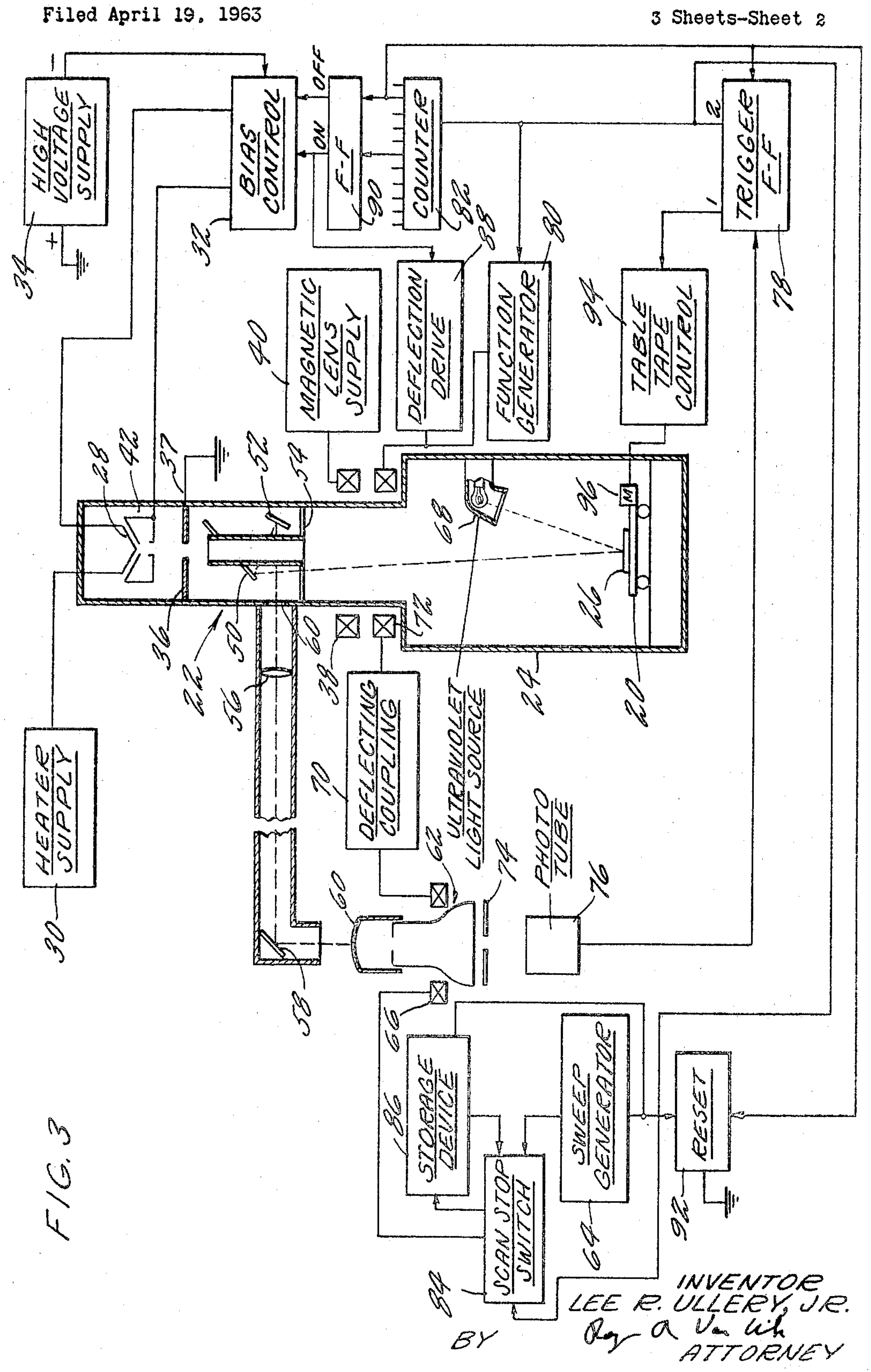
FIGURE 3 is a block diagram of a first embodiment of my invention utilized in conjunction with an electron beam machine.

Turning now to FIGURE 3, there is shown a first embodiment of my invention which enables the leads of the functional electronic blocks, capacitors and resistors of FIGURE 1 to be automatically bonded to the contact pads 12 on the substrates. To perform this function, it is necessary that a preliminary step be performed before the components are placed in the grooves on the substrates. This step consists of the application of a dot of fluorescent dye 19 to the leads extending from each of the components. The dye can be seen in FIGURES 2 and 4 where it is indicated by the shading. Once the dye has been applied, the circuit is assembled by manually positioning the components on the substrate which is in turn placed in a fixture. The fixture is then positioned on a movable table 20 in the vacuum chamber 24 of an electron beam machine 22. As explained in the above-mentioned Steigerwald patent, electron beam machines are devices which use the kinetic energy of an electron beam to work a material. The electron beam is a welding, cutting and machining tool which has practically no mass but has high kinetic energy because of the extremely high velocity imparted to the electrons. Transfer of this kinetic energy to the lattice electrons of the workpiece generates higher lattice vibrations which cause an increase in the temperature within the impingement area sufficient to accomplish work. Present state of the art electron beam machines, as a result of recently developed refinements in electron optics, can provide a beam focused to produce power densities on the order of 10 billion watts per square inch. As mentioned above, the electrons, which are accelerated through a potential of approximately 100,000 kv. or to a velocity 0.55 that of the velocity of light, may be focused into a beam which has a diameter of less than 0.0005 inch at the point of impingement on the work.

Machine 22 comprises an evacuated chamber 24 which contains the movable table 20 upon which a plurality of substrates are placed in a fixture 26. Machine 22 also comprises an electron beam column which is in communication with chamber 24 and which contains the source of electrons, beam forming means and beam focusing means. The source of electrons comprises a directly heated cathode 28 which is supplied with heating current from a current source 30. Also connected to cathode 28, through a bias voltage control 32, is a source of high negative acceleration voltage 34. An apertured anode 36 is positioned in the electron beam column between cathode 28 and the workpiece. Anode 36 is connected to the case of the machine which is grounded at 37. Also connected to ground is the positive terminal of high voltage supply 34. The difference in potential between the cathode 28 and anode 36 causes the electrons emitted from the cathode to be accelerated down the column toward the workpiece. The electrons are focused into a beam by an electron optical system comprising a plurality of adjustment coils and diaphragms, not shown, and a magnetic lens assembly 38 which is supplied with focusing current from lens current supply 40. The focused electron beam may be deflected across the surface of the workpiece by varying the deflection voltage applied to a set of magnetic deflection coils 72 on machine 22 and the position of the workpiece relative to the beam axis may be varied by repositioning movable table 20.

Positioned adjacent cathode 28 is a control electrode 42. This control electrode may be of the Wehnelt cylinder type such as disclosed in U.S. Patent No. 2,771,568, issued November 20, 1956, to K. H. Steigerwald. The control electrode is also connected to the negative terminal of high voltage supply 34 through bias control 32 and is maintained at a voltage that is more negative than the cathode voltage by control 32. Bias control 32 may be any well-known type of bias control, simply a resistance network with means for short-circuiting a portion of the resistance between the cathode and high voltage source, or control 32 may be of the type disclosed in copending application No. 214,313, filed August 2, 1962, by John A. Hansen, and assigned to the same assignee as the present invention. Control electrode 42 functions in the same manner as the grid in a triode-type vacuum tube to control the beam current. That is, by varying the bias voltage between the cathode 24 and control electrode 42, the beam may be gated on and off and its intensity or energy content may be regulated.

The electron beam machine 22 also has an optical viewing system through which the workpiece may be observed.

This optical system comprises mirrors 50 and 52, protective glass 54, a microscope including objective lens 56, and a further mirror 58. The image of the workpiece passes up the electron beam column where it is reflected by mirrors 50 and 52 which perform the function of a penta-prism to turn the image 90° Mirror 50 is apertured to permit passage of the beam down the column. The image from mirror 52 is transmitted through a window 60 in the wall of the evacuated beam column and is focused by objective lens 56 on mirror 58. The image reflected by mirror 58 is in turn projected on the surface of photoemissive catthode 60 of a phototube 62 which may be a unipotential image conversion tube such as International Telephone and Telegraph type 6411 provided with deflection coils 66. In order to illuminate the workpiece so that an image may be formed for ultimate projection on the photoemissive cathode there is provided, in the evacuated work chamber 24, a source of ultraviolet light 68. As stated above, prior to fixturing, the leads on the functional electronic blocks and other microminiature circuit elements are marked with fluorescent dye. When exposed to ultraviolet light from lamp 68, these spots of dye will fluoresce brilliantly. Thus, an image of the workpiece having very bright spots corresponding to the points where dye has been applied will be reflected by mirror 52 to objective lens 56. The objective lens and other elements, not shown, of the microscope system will focus an image of a small area of the workpiece on mirror 58. The image of this small area, equivalent in side to one of the grid squares shown in FIGURE 2, will be projected on the photoemissive cathode 60.

In operation, the image appearing on the photoemissive cathode 60 of image converter tube 62 will be scanned. The scanning of the image is accomplished by applying deflection voltages from a pair of synchronized linear sweep generators, only one of which 64 is shown, to two sets of diametrically opposed magnetic deflection coils, only one set 66 of which are shown, mounted on tube 62. In response to light incident thereon, photoemissive cathode 60 will emit electrons. The density of the electrons emitted from any point on the photoemissive surface is proportional to the intensity of the light incident thereon. By varying the deflection voltages applied to deflection coils 66, the electrons emitted from any point on the photoemissive cathode may be focused at the center of the phosphor-coated screen at the opposite end of the image converter tube. Positioned in front of the phosphor screen is a mask 74 having an aperture therein aligned with the center of the screen. When the electrons emitted from a bright spot on the image on the photoemissive cathode corresponding to the occurrence of a dye-marked lead are focused at the center of the phosphor screen by the deflecting field, the number of electrons incident on the phosphorus will be sufficient to cause the phosphor to emit a burst of light which will pass through the aperture. The deflection coils 66 which cause the image on photoemissive cathode 60 to be scanned across the aperture on mask 74 are coupled by means of a deflection coupling circuit 70 to a corresponding pair of deflection coils 72 on the electron beam machine 22. Deflection coupling means 70 may be a linear current amplifier. Thus, the beam deflection voltage in the electron beam machine will follow the scanning of the image.

The burst of light from image converter tube 62 which passes through the aperture in mask 74 is sensed by a photodiode 76 which, in response thereto, will produce an electrical output pulse. The output pulse from photodiode 76 is applied to a trigger circuit 78 which may be a bistablemultivibrator circuit. Upon receipt of an input pulse, trigger circuit 78 changes its conductive state and provides an output signal on its number 2 output while removing the existing signal from the number 1 output.

The output signal on lead 2 of trigger circuit 78 is applied to a function generator 80, counter 82 and a scan-stop switch 84. Upon application of the signal from trigger circuit 78, scan-stop switch 84, which is connected between sweep generator 64 and deflection coils 66, will be actuated. Upon actuation, scan-stop switch 84 removes the outputs of the sweep generators from the deflection coils. During scanning of the image, the output of sweep generator 64 is also applied, through scan-stop switch 84, to a storage device 86 which may be a well-known type of shift register storage circuit. That is, storage device 86 may be a free-running multivibrator driving a shift register and associated converter circuit. The multivibrator is gated on by the initiation of the ramp of the sweep generator output voltage. The multivibrator output, which is a series of pulses, is then applied to the shift register until the sweep voltage is removed from the multivibrator by the action of scan-stop switch 84. At this time, the shift register will have stored therein a count of the number of pulses generated between the beginning of the sweep and the scanning of a dye-marked lead. The count stored in the shift register may be converted into a D.C. voltage by any well-known type of digital to analog converter or by a time-to-amplitude converter of the type disclosed in U.S. Patent No. 3,172,989, issued March 9, 1965, to G. E. Nelson, and assigned to the same assignee as this invention. Summarizing the above, when scan-stop switch 84 is actuated by trigger circuit 78, the output of sweep generator 64 will be removed both from deflection coils 66 and the input to storage device 86. The shift register in storage device 86 will thus have a count stored therein proportional to the value of the linear sweep voltage from sweep generator 64 at the instant a spot of fluoresent dye indicative of the occurrence of a lead on the image of a substrate workpiece was scanned. The stored count is converted in storage device 86 to a D.C. output voltage which is applied through scan-stop switch 84 to deflection coils 72 of the electron beam machine by way of deflection coupling circuit 70. Thus, a beam deflection voltage of proper magnitude to deflect the electron beam to a point where it will impinge upon the scanned lead will be generated.

As mentioned above, the number 2 output of trigger circuit 78 is also connected to a function generator 80. Referring to FIGURE 4, the purpose of function generator 80 will now be explained. Horizontal lines *a*, *b* and *c* depict the path that the electron beam, if gated on, would trace in response to the deflection voltage applied by sweep generator 64 through deflection coupling circuit 70 to deflection coils 72. As can be seen from FIGURE 4, when the fluoresent dye on a lead is scanned during the *c* or third sweep, the scanning will be stopped and the deflection voltages maintained at values which would cause the electron beam to impinge at point *d*. As should be obvious, tacking the lead to the contact pad at this one point would not provide a sufficiently strong bond. Function generator 80 is therefore provided to generate a D.C. deflection voltage which is added to the voltage applied to deflection coils 72 from storage device 86. This small additional deflection voltage is applied to deflection coils 72 where is generates a deflecting field sufficient to cause the beam to step-up and over, as shown in FIGURE 4, until it impinges upon the center of the lead. At this point, a high frequency sine wave, generated in a manner to be described below by deflection drive circuit 88, will cause the beam to trace the sinusodial pattern shown on the lead during the welding thereby providing a strong bond.

The number 2 output of trigger circuit 78 is also applied to counter 82. It is the function of counter 82 to provide a short time delay before the electron beam is gated on. This time delay is necessary to enable the function generator 80 to generate the voltage which will vary the combined beam deflecting fields in such a manner as to cause the beam to impinge upon the center of the lead to be welded. In order to accomplish the foregoing, counter 82 may be a free-running multivibrator driving a ring counter of the type well-known in the art. Upon the appearance of a signal on the number 2 output of trigger circuit 78, the free-running multivibrator will begin providing pulses to the ring counter. In the example shown in FIGURE 3, the output of the fifth stage of the counter is connected to another trigger circuit 90 which may also be a bistable-multivibrator circuit. Thus, after the short time delay needed for the counter to register five counts, it will provide a pulse to turn on trigger circuit 90. Circuit 90 in turn provides a control signal which is applied to bias control 32 to cause the beam to be gated on. The output of trigger circuit 90 is also applied to deflection drive circuit 88, which may be an oscillator driving a current amplifier, to cause circuit 90 to begin generating the desired weld pattern signal simultaneously with the gating of the beam. Of course, as with all the circuits shown in this disclosure, in actual practice the deflection drive circuit would be duplicated so as to provide for deflection of the beam both along the lead and from side to side. Thus, upon the scanning of a lead to be welded on the image of the workpiece, the scanning of the deflection voltage will be halted, a lead centering additional deflection voltage will be generated, and the beam will be triggered on. The gated beam then traces the sinusoidal path indicated in FIGURE 4 in welding the lead to the contact pad. In the meantime, counter 82 continues to count and, after the desired welding time, will produce a second output signal which turns flip-flop circuit 90 off thereby causing bias control 32 to bias the beam off.

The second or shut-off signal from counter 82 is also applied to trigger circuit 78 and re-set circuit 92. Upon receipt of this signal, trigger circuit 78 reverts to its original conductive state thus removing the output signal from lead 2 and providing an output signal on lead 1. This action removes the enabling signals from function generator 80, counter 82 and scan-stop switch 84. The application of the beam shut-off signal from counter 82 to re-set circuit 92 causes the re-setting of storage device 86 and sweep generator 64 which are connected to ground therethrough. That is, the count stored in storage device 86 and the capacitors in sweep generator 64 across which the linear sweep voltage is derived are discharged to ground through re-set circuit 92. While the scanning system is being re-set, the number 1 output from trigger circuit 78 is being applied to a table-tape control 94. It is the function of tape control 94, upon the receipt of an input signal, to move table 20 to the next one of a programmed series of positions. Tape control 94 accomplishes this by supplying a driving signal for a motor 96 on movable table 20. Consequently, after one lead has been joined to a contact pad, the workpiece will be moved to a point where a second weld should be made. The scanning is then repeated and when the next lead to be joined to a contact pad is scanned, another weld will be made in the manner described above.

Figure 5:
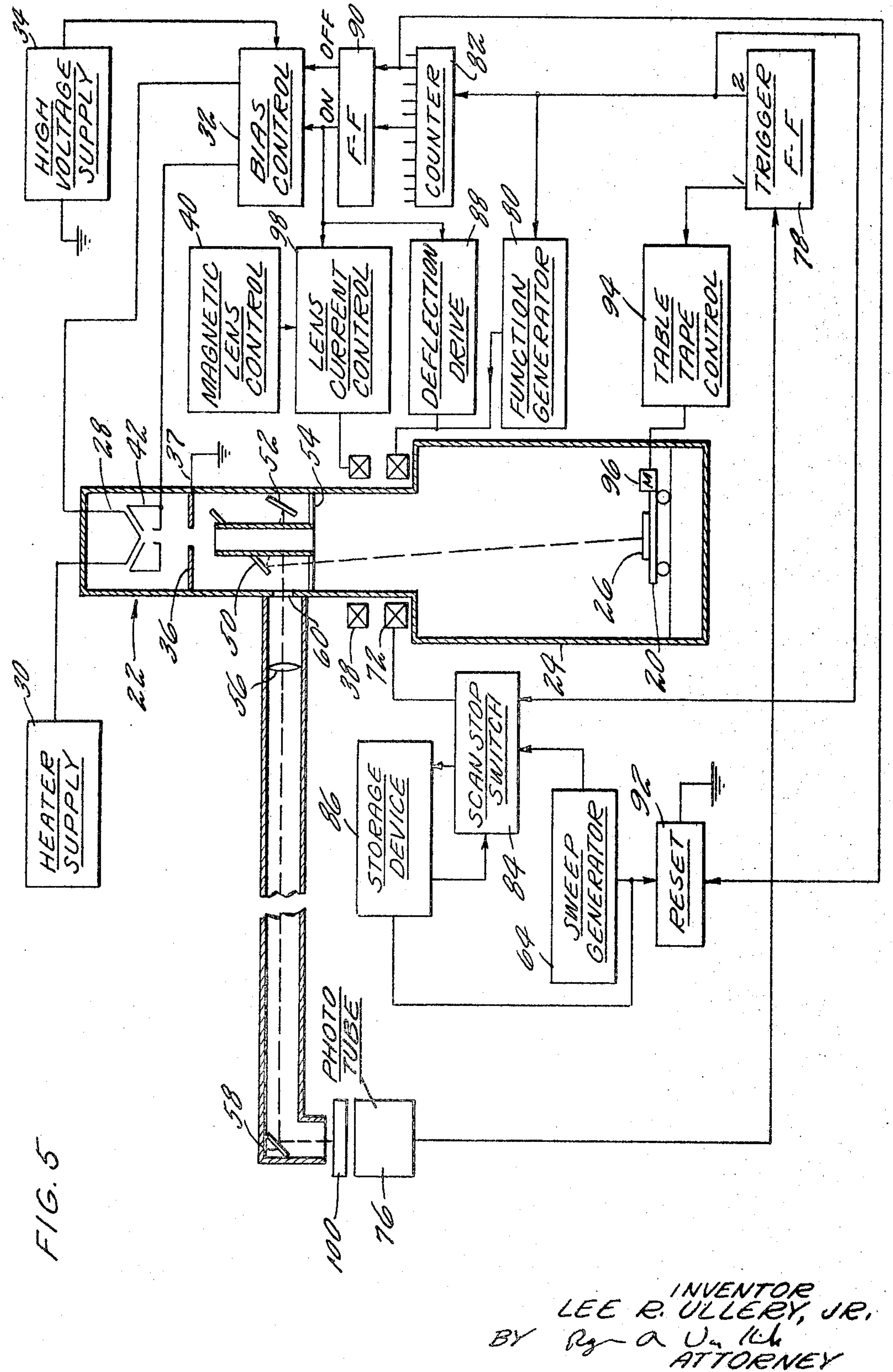
FIGURE 5 is a block diagram of a second embodiment of my invention used in combination with an electron beam machine.

Referring now to FIGURE 5, there is shown a second embodiment of my invention which eliminates the need for an image converter tube and source of ultraviolet light such as employed in the embodiment in FIGURE 3. In the apparatus depicted in FIGURE 5, an electron beam generated by electron beam machine 22 itself is used to scan the workpiece. In order to accomplish the foregoing it is, of course, necessary that a much lower energy beam be used for scanning than is used to accomplish joining. Thus, bias control 32 is adjusted so that it will provide two levels of beam current. During the scanning operation, a relatively small number of electrons are permitted to pass down the beam column while during the joining operation, when bias control 32 has a control signal applied thereto by flip-flop circuit 90, high beam current is permitted. Similarly, two levels of magnetic lens current are provided. By the addition of a lens current control 98, positioned between the magnetic lens supply 40 and the coils 38 of the magnetic lens, either of two levels of lens current may be ordered under the control of flip-flop circuit 90. Lens current control 98 may be merely a series resistance which, in response to a signal from flip-flop circuit 90, will be short-circuited by a diode or a gas discharge tube such as a thyratron. Thus, during scanning a slightly defocused, low energy beam will impinge upon the workpiece. It has been discovered that such a defocused low energy beam will not injure the microminiaturized components.

The defocused beam is caused to scan small areas of the workpiece in the same manner that the image on the photoemissive cathode of the image converter tube of FIGURE 3 is scanned. That is, the output of a sweep generator 64 is applied through scan-stop switch 84 to deflection coils 72 to cause the defocused beam to scan a portion of the workpiece. Recent research in the field has led to the discovery that a slightly defocused, low energy electron beam is a valuable tool for nondestructive testing. For example, it has been found that virgin alumina of the type which may be used for substrate 10 of FIGURES 1 and 2 fluoresces light red when scanned with a low energy, defocused electron beam. The dye coated on the ends of the leads of the microminiature circuit components will also fluoresce when activated by the low energy electron beam. The dye will be selected so that its fluoresence is of a different color than that of the substrate. The contact pads 12 will not fluoresce themselves and will mask the fluoresence from the substrate. Thus during scanning, in the simplest case, the workpiece will alternately present to the optical system light of a first color, absence of light, and light of a second color. This spectra is focused on mirror 58 which in turn projects it on a filter 100 which is positioned in front of photodiode 76. Filter 100 is chosen so as to pass only the color light indicative of the fluorescent dye. Thus, during scanning, phototube 76 will be energized by incident light only when a dye marked lead is scanned by the defocused electron beam. At this time, phototube 76 will provide a command signal to trigger circuit 78 which, in the manner described in relation to the embodiment of FIGURE 3, will cause the beam to stop scanning and to move up and over to the center of the lead. Then through the combined action of counter 82 and flip-flop circuit 90, the bias control 32 and the lens current control 98 will be activated to increase beam current and to bring the beam sharply into focus. The high intensity focused beam then makes the weld in accordance with the weld pattern signal provided by deflection drive circuit 88. Upon completion of the weld, the circuit is re-set for another scanning operation and the workpiece moved under the control of tape control 94 in the manner described above in relation to FIGURE 3.

While preferred embodiments of my invention have been shown and described, various modifications and substitutions may be made without deviating from the spirit and scope of my invention. Thus, while I have discussed my invention in terms of utilizing an electron beam as the joining tool in the assembly of microminiature electronic circuits, the beam from a solid or gaseous laser could be used for this purpose under the control of my invention. Electron beam joining has been shown and described solely because, under the present state of the art, it is the most efficient joining procedure that is suitable for the very exacting work involved. Thus, my invention is described by way of illustration rather than limitation and accordingly, it is understood that my invention is to be limited only by the appended claims taken in view of the prior art.

I claim:

1. Apparatus for working an article with an energized beam comprising:
means for generating an energized beam,
means for supporting an article to be worked generally in the path of said beam,
means for varying the energy content of said beam,
means for deflecting said beam,
means for focussing said beam at the article to be worked,
means connected to said deflecting means for causing said beam in a low energy state to scan the article to be worked,
means responsive to emission emanating from a point to be worked on the article during scanning with the low energy beam for generating a work initiation signal,
means applying said work initiation signal to said means for varying beam energy to cause a high energy beam to be generated when a point to be worked is scanned, and
means applying said work initiation signal to said means for causing the beam to scan to halt scanning when a point to be worked is scanned.

2. The apparatus of claim 1 wherein the means for causing the beam to scan comprises:
means for generating a scanning control signal, and means for applying said control signal to said beam deflecting means.

3. The apparatus of claim 2 wherein the means to halt scanning comprises:
signal storage means responsive to said scanning control signal for storing said signal, and
means responsive to a work initiation signal for removing the scanning control signal from the beam deflecting means and applying the output of said storage means thereto.

4. The apparatus of claim 3 wherein the means for generating a work initiation signal comprises:
means responsive to a particular frequency of the emission from the article to be worked for generating a work initiation signal.

5. The apparatus of claim 4 further comprising:
second means responsive to said work initiation signal for adjusting the focus of said beam whereby the scanning beam may be slightly defocussed and will be refocussed upon generation of a work initiation signal.

References Cited by the Examiner

UNITED STATES PATENTS

| | | | |
|---|---|---|---|
| 2,356,567 | 8/1944 | Cockrell | 250—214 X |
| 2,532,063 | 11/1950 | Herbst. | |
| 2,819,380 | 1/1958 | Eaton. | |
| 2,938,424 | 5/1960 | Herriott | 250—220 X |
| 3,016,449 | 1/1962 | Steigerwald | 219—117 |
| 3,029,348 | 4/1962 | Heinz | 250—220 |
| 3,038,369 | 6/1962 | Davis | 250—204 X |
| 3,092,727 | 6/1963 | Leinhos et al. | 219—121 X |
| 3,140,379 | 7/1964 | Schlaich et al. | 219—117 X |
| 3,148,265 | 9/1964 | Hansen | 219—117 |
| 3,158,733 | 11/1964 | Sibley | 219—121 X |

RICHARD M. WOOD, *Primary Examiner.*

JOSEPH V. TRUHE, A. BARTIS, *Examiners.*